(12) United States Patent
Zielinski et al.

(10) Patent No.: US 6,396,395 B1
(45) Date of Patent: May 28, 2002

(54) PROGRAMMABLE VEHICLE STOPPING SYSTEM AND PROCESS FOR ROUTE LEARNING

(76) Inventors: Andrew J. Zielinski, 1411 Sevan Lake Ct., Fort Wayne, IN (US) 46825; Brad A. Hively, 7311 Flutter Rd., Fort Wayne, IN (US) 46835; Gary L. Vandermolen, 916 Red Bluff Dr., Fort Wayne, IN (US) 46804-9082

( * ) Notice: Subject to any disclaimer, the term of this patent is extended or adjusted under 35 U.S.C. 154(b) by 0 days.

(21) Appl. No.: 09/659,808

(22) Filed: Sep. 11, 2000

(51) Int. Cl.[7] .................................................. B60Q 1/00
(52) U.S. Cl. ..................... 340/425.5; 340/433; 340/471; 340/472; 340/332; 180/271
(58) Field of Search ............................... 340/425.5, 433, 340/436, 901, 488, 480, 471, 472, 332; 180/271; 116/28 R, 51, 52, 53, 54, 200, 202; 307/9.1

(56) References Cited

U.S. PATENT DOCUMENTS

| | | | | |
|---|---|---|---|---|
| 5,281,948 A | * | 1/1994 | Estrada ......................... 340/433 |
| 5,293,151 A | * | 3/1994 | Rose ............................ 340/433 |
| 5,557,257 A | * | 9/1996 | Gieffers ....................... 340/474 |
| 5,564,359 A | * | 10/1996 | Harder ....................... 116/28 R |
| 5,635,902 A | * | 6/1997 | Hochstein .................... 340/433 |
| 5,796,331 A | * | 8/1998 | Lamparter ................... 340/433 |
| 5,812,052 A | * | 9/1998 | Swanger et al. ............. 340/433 |
| 5,839,304 A | * | 11/1998 | Wills ............................. 70/175 |
| 5,847,642 A | * | 12/1998 | Esposito et al. ............. 340/433 |
| 5,860,385 A | * | 1/1999 | Lamparter ................. 116/28 R |
| 6,009,650 A | * | 1/2000 | Lamparter .................... 40/572 |
| 6,189,644 B1 | * | 2/2001 | Taylor ......................... 180/271 |
| 6,234,105 B1 | * | 5/2001 | Lamparter ................. 116/28 R |

* cited by examiner

Primary Examiner—Daniel J. Wu
Assistant Examiner—Toan Pham
(74) Attorney, Agent, or Firm—Jeffrey P. Calfa; Neil T. Powell; Dennis Kelly Sullivan

(57) ABSTRACT

A programmable bus stopping system of a mobile vehicle in electrical communication with controllers or actuators for all of the safety and warning devices requiring actuation upon a vehicle stop for passenger egress. The electrical communication may be through an area wide network that may allow multiplexing. In addition the controllers or actuators, the communication network may be electrically engaged to an electronic system controller for coordinating operation of controllers and actuators. There may be a manual switch, push-button, or actuator accessible to the driver of the vehicle that allows communication to activate a series of activities that must occur upon a bus stopping to let on or let off passengers. The system activation points may be tied to vehicle speed or to vehicle position relative to a stop requiring a component or components to activate. The system may learn a route and the automatic actions of the safety and warning devices of the vehicle when a driver drives the route once manually initiating the actions and then the system programs itself to perform all the actions related to safety and warning devices.

23 Claims, 10 Drawing Sheets

PROGRAMMABLE VEHICLE STOPPING SYSTEM AND PROCESS FOR ROUTE LEARNING

BACKGROUND OF THE INVENTION

School buses and to a lesser degree other people transportation vehicles have a number of components which need to be operated upon stops. For example upon stopping for passenger entry or exit egress, the driver of a school bus must operate flashing lights, foldable stop signs, bumper crossing arms, door openers, and parking brake of the vehicle. These requirements, most of them statutory, add demands upon the driver who is supposed to be watching out for passenger safety and operating the vehicle safely all at the same time. This invention relates to a system for a school bus or other people transportation vehicle that allows for one switch manual activation of all the stopping safety and warning lights and for automatic activation of all of these devices as sensed by vehicle position. Additionally, vehicle electronic controllers may be programmed to learn routes and all stops for which the automatic operation of the above safety and warning lights require operation. The system may be back-fit into a vehicle or programmed into controllers of a multiplexed electronic controller network. The invention also includes the steps of initiation and of learning routes, these steps recorded on tangible computer media.

PRIOR ART

School bus drivers must operate numerous safety and warning devices when they approach a stop to pick up passengers. This could potentially reduce the drivers ability to focus their full attention on the safety of the passengers, who may include children. In the prior art, the drivers of school buses had to individually operate all safety and warning devices, such as flashers, stop signs, crossing arms, door openers, and parking brakes manually.

Current vehicles have different forms of electronic communication networks. At a simple level, communication between two agents may be kept physically separated from communications occurring among other agents. Where two or more signals do not use the same physical space, there is no need to separate the signals in time or in carrier wave frequency. Such a communications regime is sometimes termed physical division multiplexing although the term multiplexing is usually reserved to techniques for applying multiple signals to a single medium or physical space. So-called physical division multiplexing describes how motor vehicles have been traditionally wired. The use of separate dedicated wires to connect each switch and lamp is a type of physical division multiplexing. Obviously, physical division multiplexing, while simple in concept, results in the use of many wires (the classical motor vehicle electrical harness), which are difficult to install during manufacturing and problematic to maintain in the field.

Arrangements allowing a number of agents to communicate over a common physical layer or medium offer much greater physical simplicity. Intelligible communication between two or more devices among a greater plurality of devices, all over a common medium, depends upon the communicating devices being able to distinguish, and understand, messages directed to them from other messages which they receive, but which are not intended for them. The process of distinguishing messages depends upon the transmitter of the message applying some attribute to the message which identifies it to the intended recipient. In human conversation, most people readily distinguish speech directed to them from interfering cross-talk in a crowd by the distinctive aspects of the voice of the person addressing them. Where the members of the group are electrical components, the problem still involves identification of a distinguishing attribute of the signal. Appropriate attributes for signals take a number of forms.

A line communicating a signal from a remote switch to a lamp to turn on or off (by having a second switch, local to the lamp, change states to control connection of the lamp between a power bus and ground) cycles only rarely. In a typical trip such a change in state occurs only once or twice, if at all. Where such a line is not intended to provide power to the lamp, and simply indicates changes in state for the local switch controlling the lamp, the line will have the capacity to handle far more data than the occasional indications to turn a lamp on and off. The objective of maintaining simplicity in manufacturing and maintenance are preferably met by allowing communication among a number of components to occur in a single medium, or at least as few communication lines as possible. The line used to connect switch and lamp could interconnect a number of components, carrying messages between any grouping of elements connected to the line when not required to carry an instruction to a lamp to turn on. One way of achieving this objective is a communications regime that divides time into slots during which particular combinations of components have use of a signaling line. Such methods are well known in the art and are examples of time division multiplexing (TDM), In motor vehicles, time division and related multiplexing techniques offer substantial simplification in physical layer required to support the control of vehicle vocations. The invention of this application involves one of those vocations.

Rigid time division multiplexed communications appear to interleave data signals into a single serial signal over a single physical medium. Multiplexed communication systems also provide the reverse function (de-multiplexing) of dividing the single signal into multiple, non-synchronous digital signals. Where demands on the capacity of the data transmission medium are not especially heavy, any unit may be allowed to claim the medium provided collision detection is provided for and other indicia, such as address headers, indicate the signal's destination.

As applied to motor vehicles, multiplexed communications over serial data paths are an effective technique for reducing the number of dedicated communication paths between the numerous switches, sensors, devices and gauges installed on the vehicles. With each increase in the number and variety of accessories and functions installed on each vehicle, the benefits of using a single, multiplexed communication serial link for passing instructions to and receiving information from vehicle devices as diverse as running lights and rear axle temperature sensors becomes greater. Multiplexing the signals to and from local controllers and switches for vehicle systems promises greater physical simplicity through displacing much of the vehicle wiring harness, reducing manufacturing costs, facilitating vehicle electrical load management, and enhancing system reliability.

The specific manner of implementing multiplexed communications is outside the scope of the present invention, which may apply a defined protocol, the SAE J1939 protocol or a proprietary protocols over a network similar to that described here. The development by the Society of Automotive Engineers of the J1939 series of standards for multiplexed communications testifies to the progress in the application of multiplexed communications to vehicles.

Standards have been or are being developed relating the communication path, transmission collision detection, diagnostic ports and data protocols, among other topics. The J1939 protocol provides an open protocol and definition of the performance requirements of the medium of the physical layer, but also allows for development of proprietary protocols. The SAE J1939 protocol is a specialized application of a controlled area network (CAN) and may be readily implemented utilizing commercial integrated circuits such as the C167 Integrated Circuit from Siemens of Germany.

A serial communications system utilizing a multiplexing regime can link several remote digital controllers or actuators or sensors positioned around a vehicle with an electrical system controller (ESC) for two-way communication. Remote digital controllers are addressable, allowing them to respond to signals intended for them initialize particular functions. As described above the transmission ECM may be a remote digital controller. They may also include programming that allows the device to react to local conditions as well as condition indicating signals provided the controller. The ESC may pass requests and instructions received for operations of certain devices, addressed to the correct remote controller, in a fashion to condition the timing and duration of the responses to requests to better manage overall vehicle electrical load.

To date, there has not been a school bus or passenger vehicle that a driver may operate a single control to operate all of the safety and warning devices. Neither has there been such a vehicle that may be programmed to automatically operate these devices as a function of the vehicles position relative to programmed stopping points. There has not been a system where by all of the safety and warning devices are in communication with an ESC through a multiplexed vehicle communication system. Additionally, there has not been a system or software for a system for a school bus or passenger vehicle that may learn a route by a driver driving the route once and then programming itself to perform all the actions related to safety and warning devices.

SUMMARY OF INVENTION

As a result, a primary object of this invention is to provide a school bus or passenger vehicle that a driver may operate a single control to operate all of the safety and warning devices. A second object of the invention is to provide a vehicle that may be programmed to automatically operate these devices as a function of the vehicle's position relative to programmed stopping points. A third object of the invention is to provide all of the safety and warning devices of a bus be in communication with an ESC through a multiplexed vehicle communication system. A fourth object of the invention is to provide a system or software for a system for a school bus or passenger vehicle that may 'learn' a route including the automatic actions for the safety and warning devices.

The programmable bus stopping system of this invention satisfies all of the above objectives. The bus stopping system is comprised of a vehicle in electrical communication with controllers or actuators for all of the safety and warning devices requiring actuation upon a vehicle stop for passenger egress. The electrical communication may be through an area wide network that may allow multiplexing. In addition the controllers or actuators, the communication network may be electrically engaged to an electronic system controller for coordinating operation of controllers and actuators. There may be a manual switch, push-button, or actuator accessible to the driver of the vehicle that allows communication to activate a series of activities that must occur upon a bus stopping to let on or let off passengers. Some of these activities include: actuating sequential sets of flashing lights or flashers to indicate the vehicle is slowing and then stopped, deploying a retractable stop sign on the side of the vehicle, opening a crossing arm mounted to a bumper to prevent passengers from crossing too close to a portion of the vehicle, applying a vehicle parking brake and then opening the door. When the vehicle restarts, the actions are reversed. The system activation points may be tied to vehicle speed or to vehicle position relative to a stop requiring a component or components to activate.

The system may learn a route and the automatic actions of the safety and warning devices of the vehicle when a driver drives the route once manually initiating the actions and then the system programs itself to perform all the actions related to safety and warning devices.

DRAWINGS

Other objects and advantages of the invention will become more apparent upon perusal of the detailed description thereof. In upon inspection of the drawings, in which.

DETAILS OF INVENTION

Figure 1:
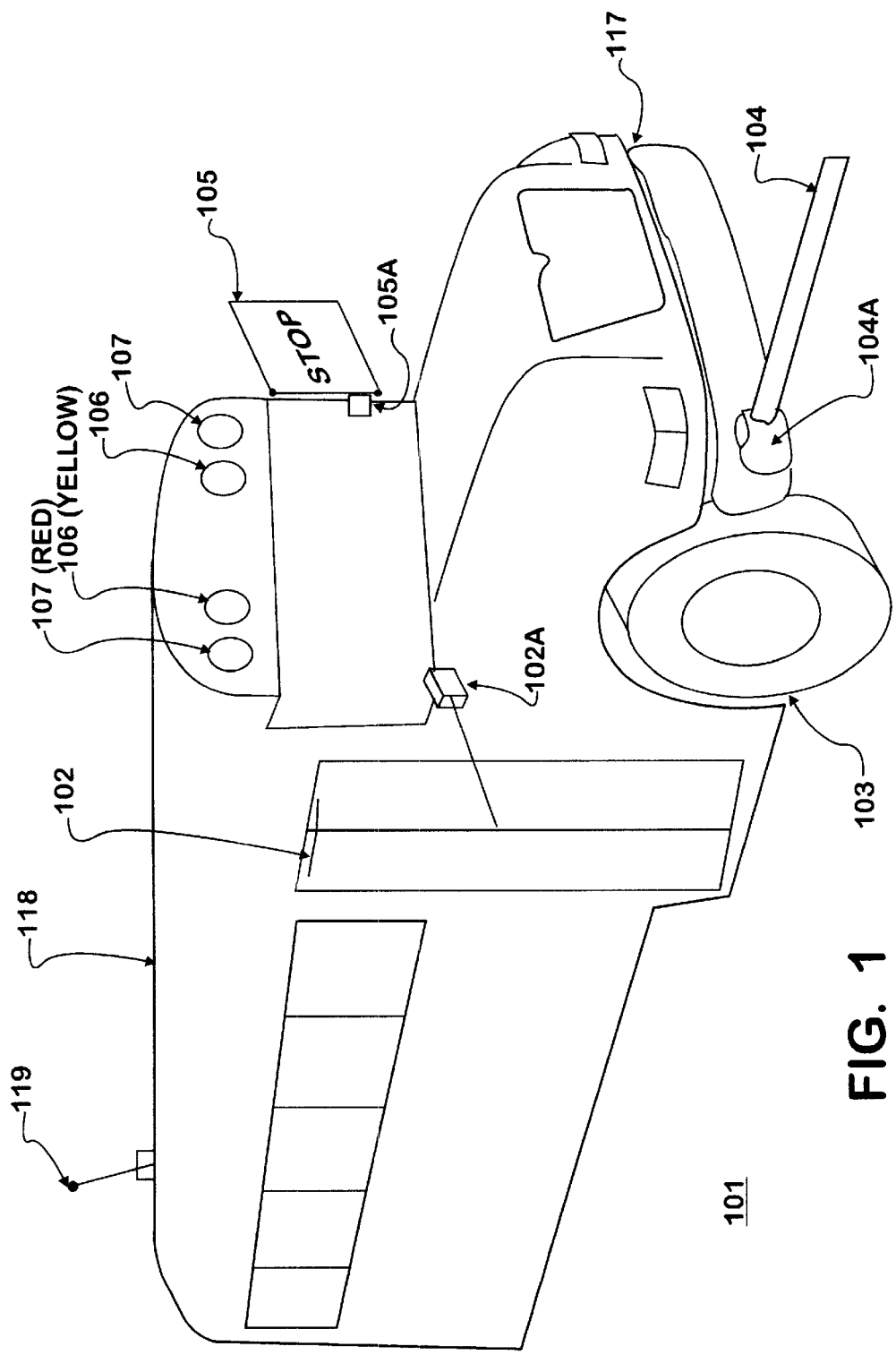
FIG. 1 is a perspective view of a vehicle with a programmable stopping system made in accordance with this invention.

A vehicle 101 with a programmable stopping system 109 made in accordance with this invention is shown in FIG. 1. The vehicle contains a chassis 117 and a body 118. When the vehicle 101 is a school bus, the chassis 117 in combination with the body 118 of the vehicle 101 may contain a passenger door 102 controlled by a door operator 102A, a parking brake 103 applied or engaged by a parking brake actuator 103A, a crossing arm 104 controlled by a crossing arm operator 104A, a retractable stop sign 105 operated by a stop sign operator 105A, yellow flashing lights 106 and red flashing lights 107. The vehicle 101 may contain a sensed parameter measurement device 190 such as a speed sensing device 121 or a navigation system 131, for providing the geographic location of the vehicle 101. The navigation system may be a Global Positioning System (GPS) that takes an external input from a satellite like the commercially available LORAN system. The navigation system 131 may alternatively be a dead reckoning system without an external input or a combination of an external system and an internal to the vehicle 101 dead reckoning system.

Figure 2:
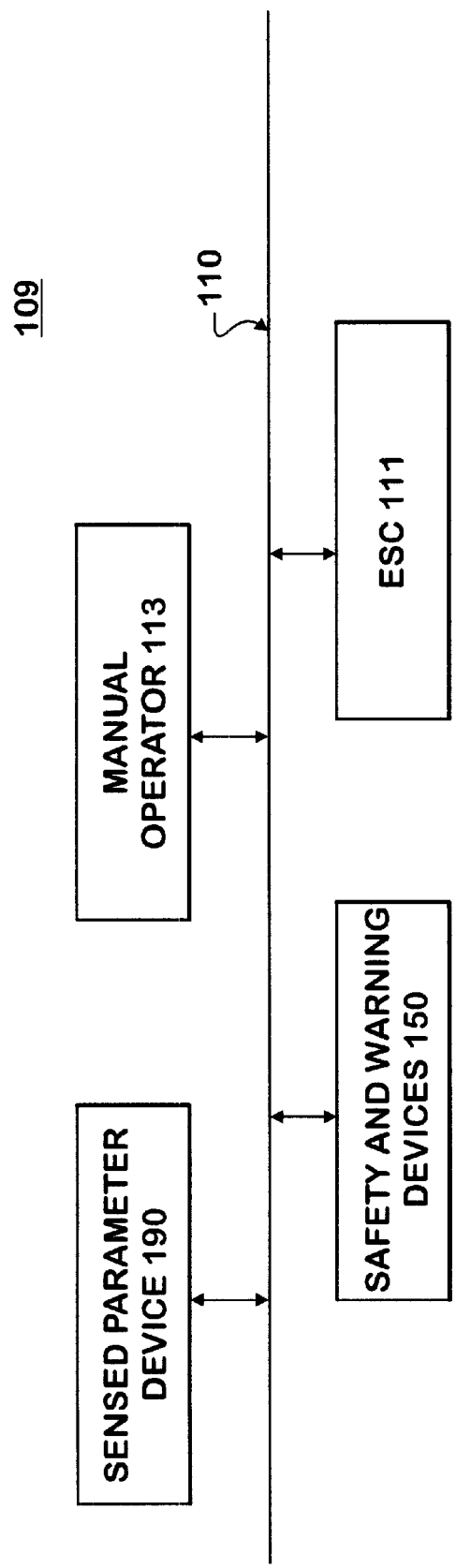
FIG. 2 is a high level overview of an electronic system that may include the stopping system of FIG. 1.
Figure 3:
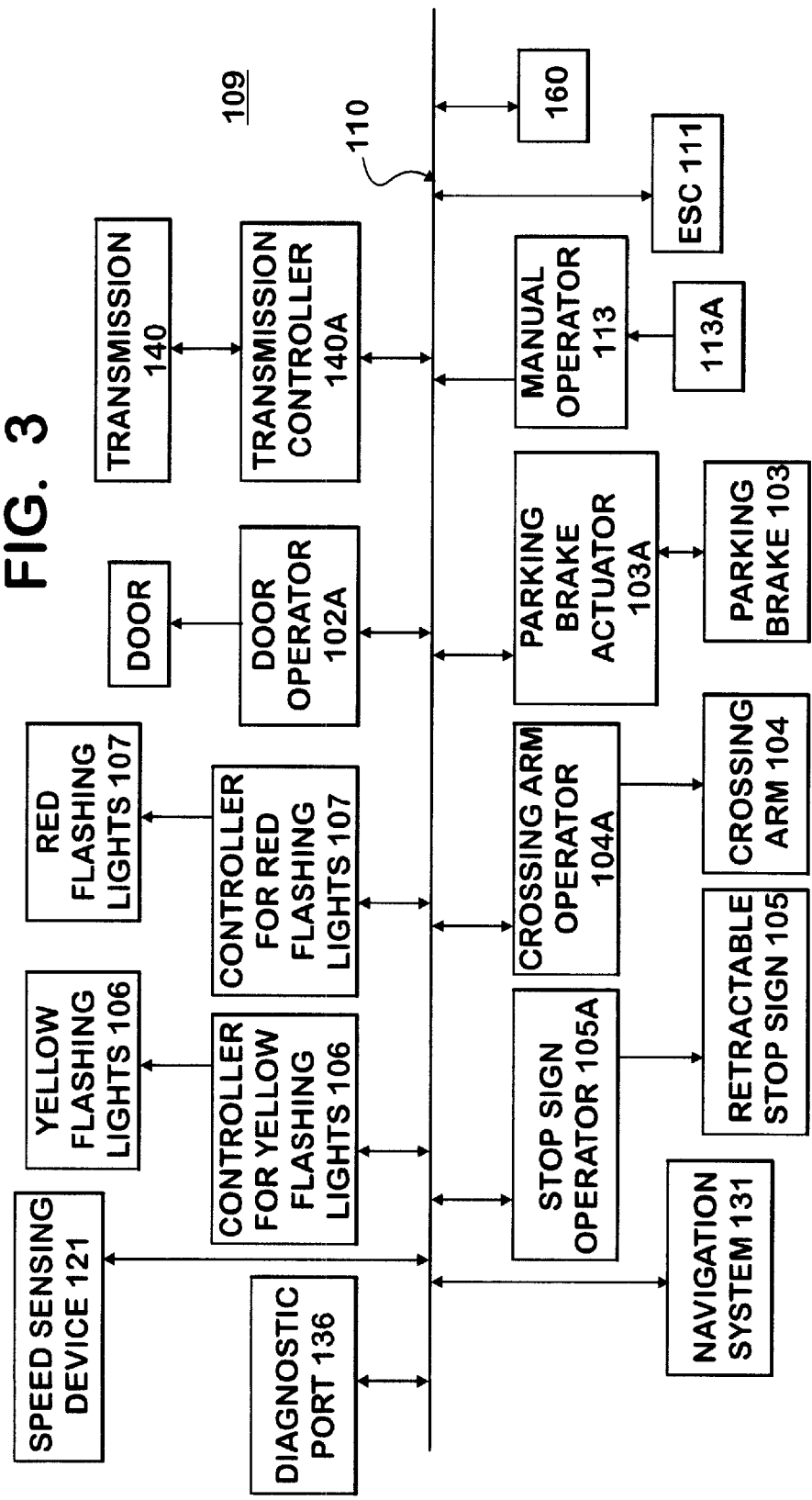
FIG. 3 is a more detailed overview of one embodiment of the electronic system of FIG. 2.

The invention in is its most basic form includes safety and warning devices 150 required to be initiated upon stopping a passenger carrying vehicle 101, a manual operator 113, a sensed parameter measurement device 190, and a common data bus 110 engaged to the manual operator 113, the sensed parameter device 190, and the safety and warning devices 150. The manual operator 113 communicates with the safety and warning devices 150 to activate the devices 150 over the common data bus 110. Such communication is by a standard communication protocol that may be the SAE J1939 protocol. This basic embodiment is shown in FIG. 2. The programmable stopping system 109 may additionally comprise an electrical system controller (ESC) 111, which may be the primary component of a vehicle electronic control system or alternatively may be a different electronic processor. ESC 111 may manage a number of vocational controllers disposed on vehicle 101 and executes a load management program which oversees the total load imposed on the vehicle electrical system and power train by various accessories installed on the vehicle. Most active vehicle components such as the safety and warning devices 150 are directly controlled by one of a group of dependent controllers, operators, or actuators which include the door operator 102A, the parking brake actuator 103A, the crossing arm operator 104A, the stop sign operator 105A, and controllers for the yellow flashing lights 106 and the red flashing lights 107, all of which are connected to ESC 111 over the common data bus 110. See FIG. 3. The applicable controllers, operators, or actuators are considered a sub-component of the component they operate under this specification. The ESC 111 may be programmed to direct operation of the controllers, operators, and actuators of the safety and warning devices.

The common data bus 110 may be a serial data bus or link 110. The autonomous controllers or operators may include local data processing and programming and are typically supplied by the manufacturer of the controlled component. The serial data link 110 may be a twisted pair cable constructed in accordance with SAE standard J1939 and may be externally accessible via a diagnostic port 136. Although the autonomous controllers handle many functions locally and are functionally difficult without reference to ESC 111, they report data to ESC 111 and can receive operational requests from ESC 111. An example of data reports to the ESC 111, might be the position of the crossing arm 104 from the crossing arm operator 104A. An example of an operational request from the ESC 111 to the crossing arm operator 104A might be direction to open or deploy a front mounted crossing arm 104 to prevent a passenger from crossing too close to the front of the vehicle 101. The alternative common data bus 110 may operate using proprietary communication protocol other than an industry standard.

Figure 7:
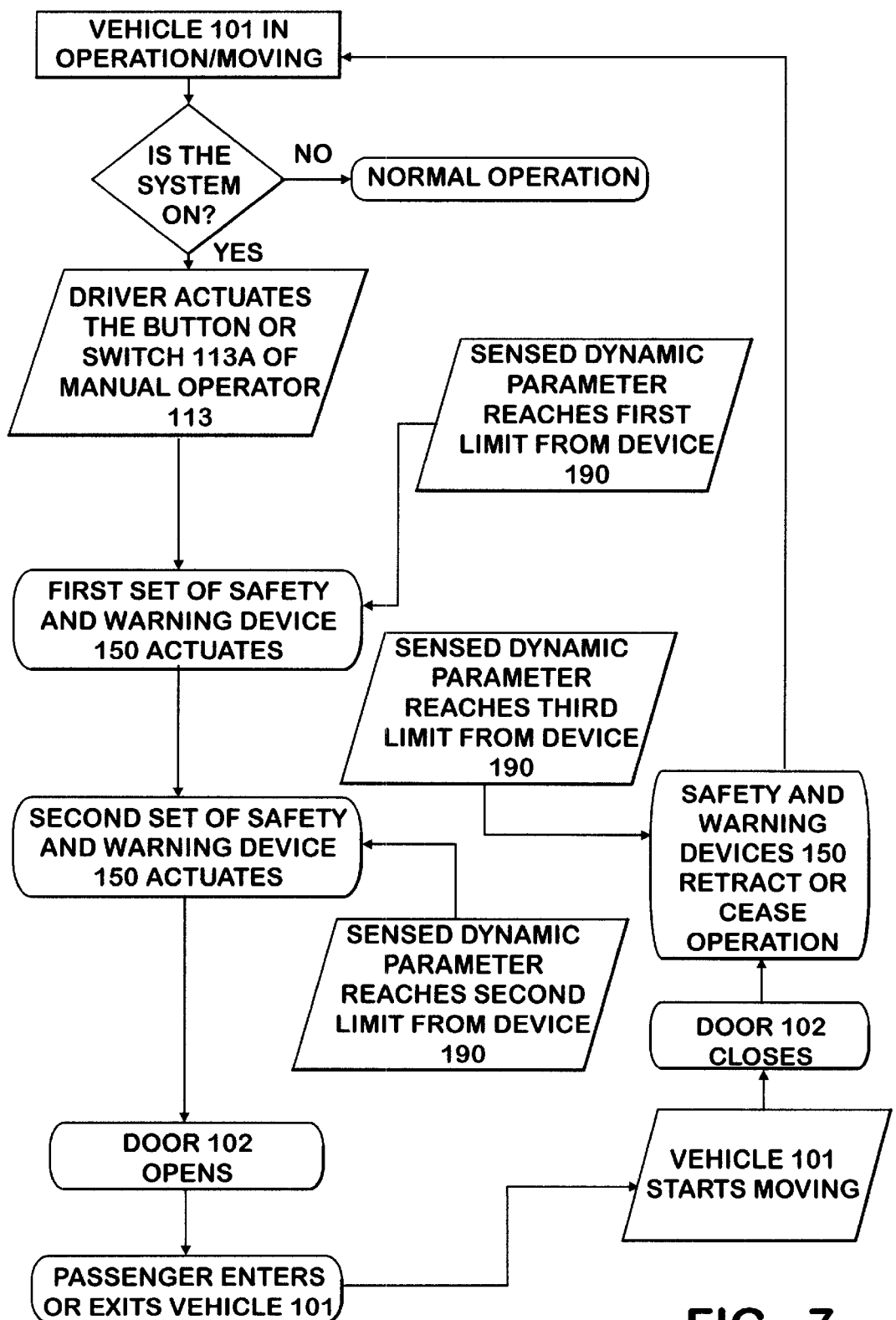
FIG. 7 is a fourth embodiment of logic employed in the stopping system of FIG. 1.
Figure 8:
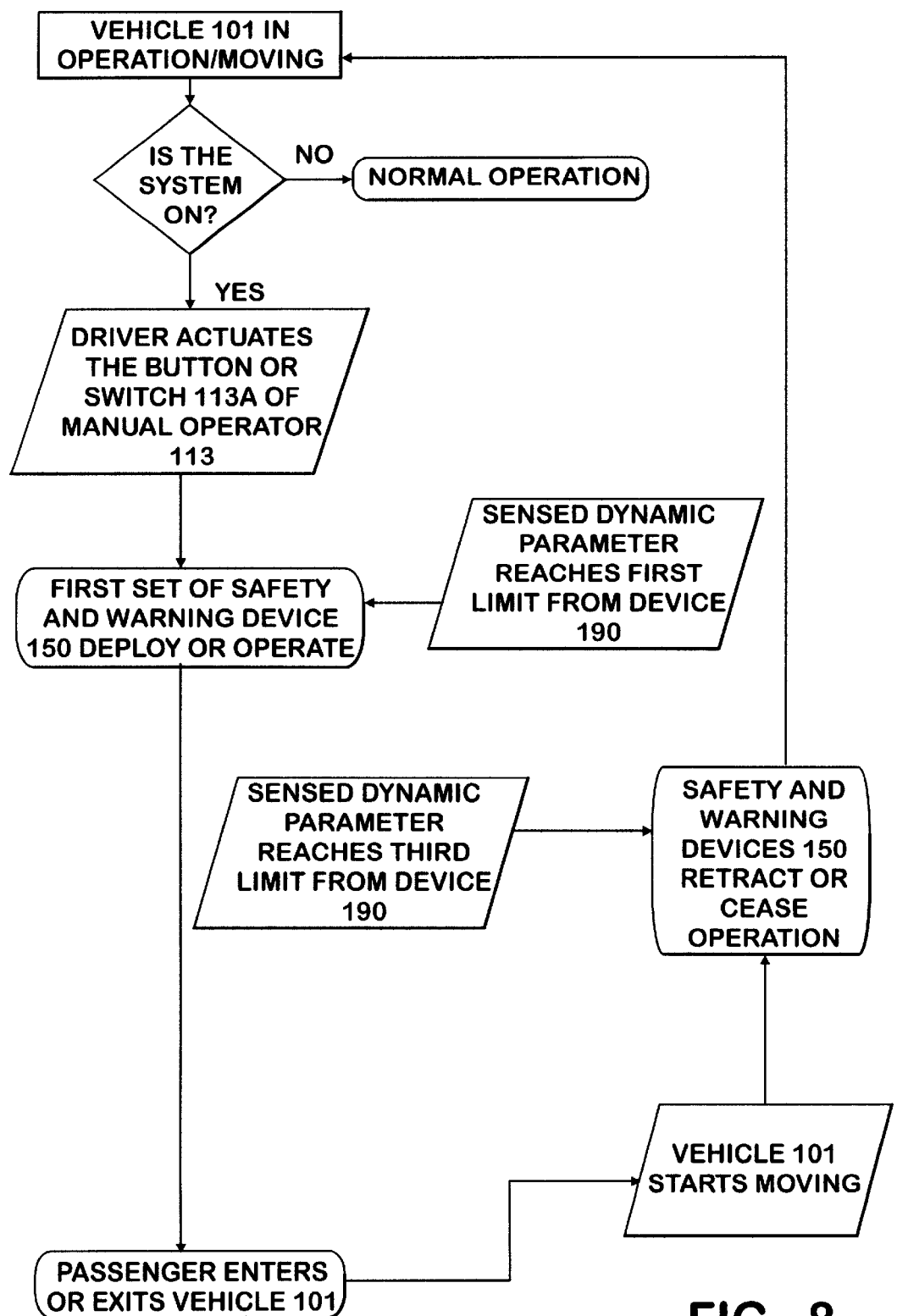
FIG. 8 is a fifth embodiment of logic employed in the stopping system of FIG. 1.

The ESC 111 may be programmed to operate all, one, or some of the safety and warning devices 150 upon an initiation condition or sequence of initiation conditions as shown in FIG. 7. One programmed stop sequence is commenced by use of the manual operator 113 located in a convenient location for the driver. The manual operator 113 contains a button or switch or lever 113A that the driver may operate to initiate the speed initiated sequence. A semi-automatic sequence of initiating events is commenced by the driver actuating the button 113A prior to commencing slowdown to stop. The ESC 111 receives the semi-automatic sequence message over the data link 110 and then provides sequential signals to sets of the applicable safety and warning devices 150, also over the data link 110, to actuate based upon a sensed dynamic parameter from the sensed parameter measurement device 190 and a pre-programmed sequence of steps. The embodiment shown in FIG. 8 demonstrates that there may be as few as one set of safety and warning devices 150 to be actuated and that the vehicle door operator 102A does not necessarily have to be one of the safety and warning devices 150. The sensed dynamic parameter may be vehicle 101 speed alone from speed sensing device 121, vehicle 101 position as sensed by the navigation system 131 alone, or a combination of speed and location.

Figure 4:
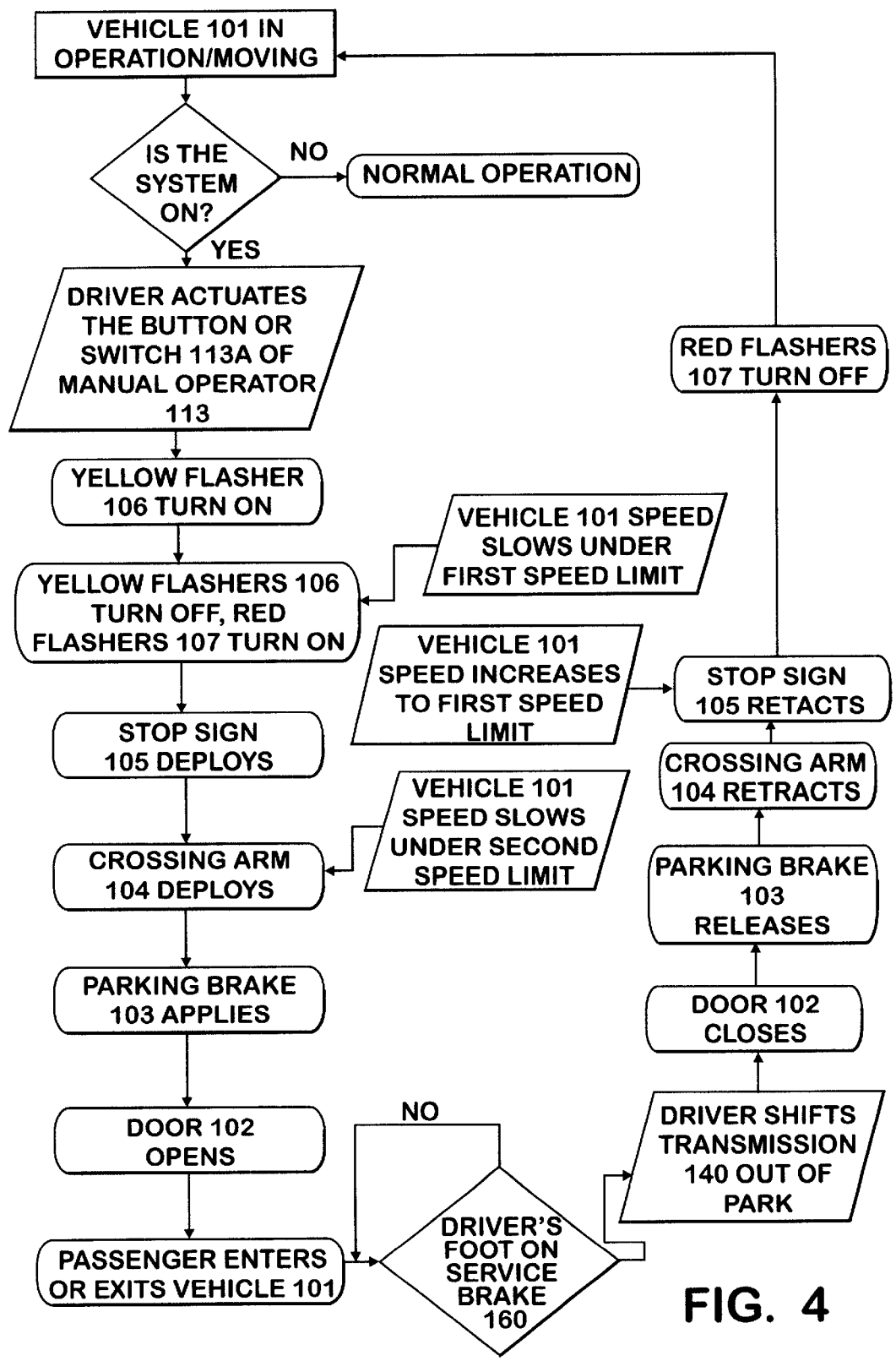
FIG. 4 is a flow chart showing an embodiment of the logic employed in the stopping system of FIG. 1.

One embodiment of the semi-automatic sequence with speed alone as the sensed parameter is shown in FIG. 4. The actual speed activation levels may be varied. The driver will have selected a 'stopping mode'. Subsequently, once the driver actuates the button or switch 113A, the ESC 111 directs the controller for the yellow flashing lights 106 to turn these lights on in a flash mode. As the ESC 111 receives a signal from the speed sensing device 121 that the vehicle has slowed to under a first speed limit, for example 5 miles per hour, the ESC 111 directs the controller for the yellow flashing lights to turn off the yellow flashers. Coincidentally, the ESC 111 directs the controller for the red flashing lights to turn these lights on in a flash mode. The ESC 111 then directs the stop sign operator 105A to deploy the stop sign 105. As the ESC receives a signal from the speed sensing device 121 that the vehicle has slowed to under a second speed limit, for example 2 miles per hour, the ESC 111 directs the crossing arm operator 104A to deploy the crossing arm 104. When the driver shifts the transmission 140 of the vehicle 101 into a 'PARK' position, a transmission controller 140A relays this change to the ESC 111. The ESC 111 then directs the parking brake actuator 103A to engage the parking brake 103. Where there is a door opener other than manual, the ESC 111 also directs the door operator 102A to open the door 102. The alternatives to manual may include electrical, motor driven, air, hydraulically operated doors. When the parking brake 103 is released, the ESC 111 will direct the door operator 102A to close the door 102 if the door is operated other than manual. In one embodiment, there may be an interlock between the service brake of the vehicle operated by the drivers foot pedal and the parking brake actuator 103A. This interlock provides a foot pedal sensor 160 indicating whether the brake foot pedal is depressed. If the brake foot pedal is depressed, the ESC 111 will direct the parking brake actuator 103A to release the parking brake 103 when the driver shifts the transmission out of 'PARK' to 'RUN' or 'OPERATE'. The ESC 111 then directs the crossing arm operator 104A to retract the crossing arm 104. As the ESC receives a signal from the speed sensing device 121 that the vehicle has increased speed to over the first limit, for example 5 miles per hour, the ESC 111 then directs the stop sign operator 105A to retract the stop sign 105. The ESC 111 directs the controller for the red flashing lights to turn these lights off. The first speed limit and the second speed limit may be varied in the programming depending on state law or customer preference.

Figure 5:
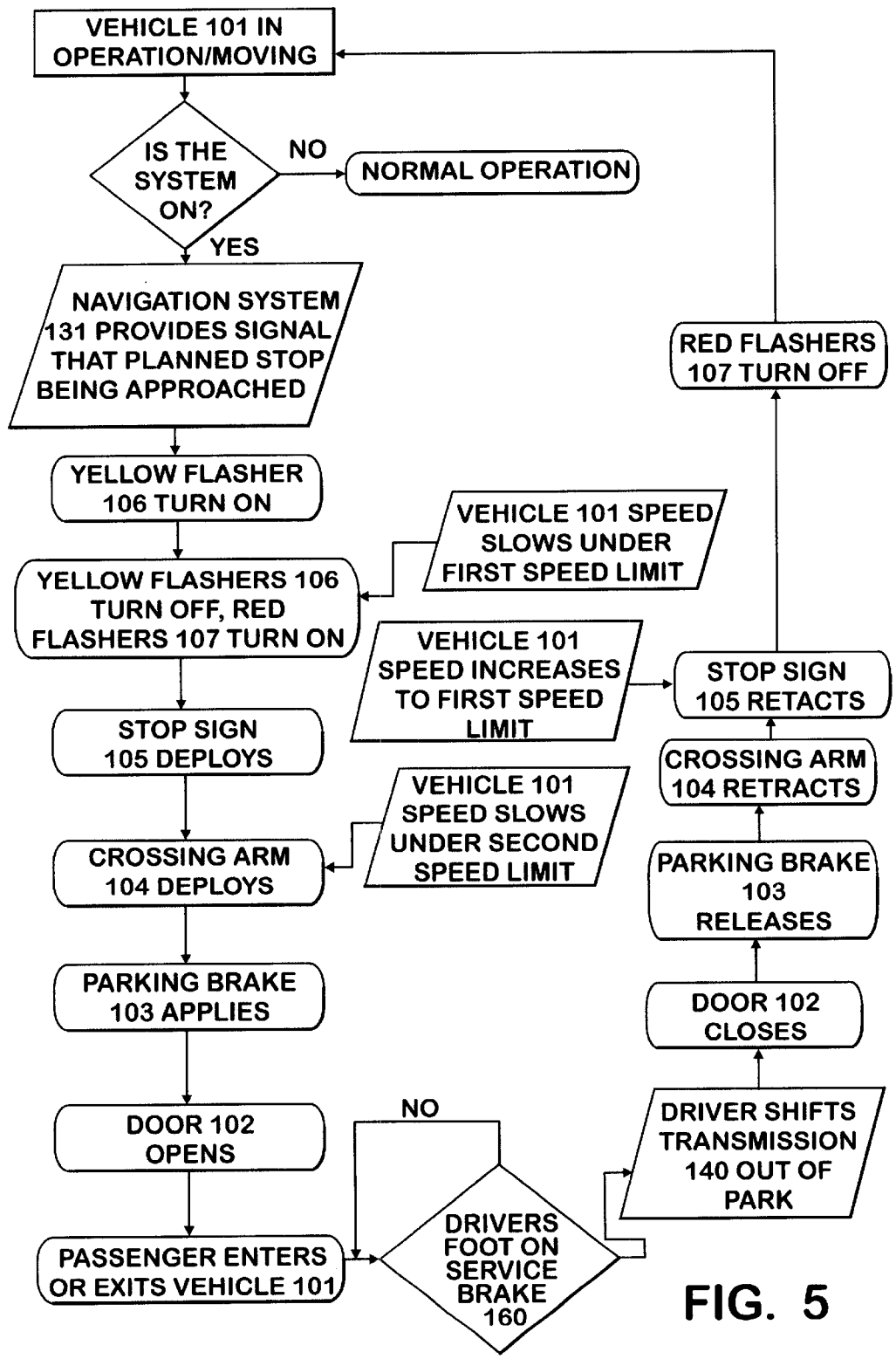
FIG. 5 is a second embodiment of logic employed in the stopping system of FIG. 1.
Figure 6:
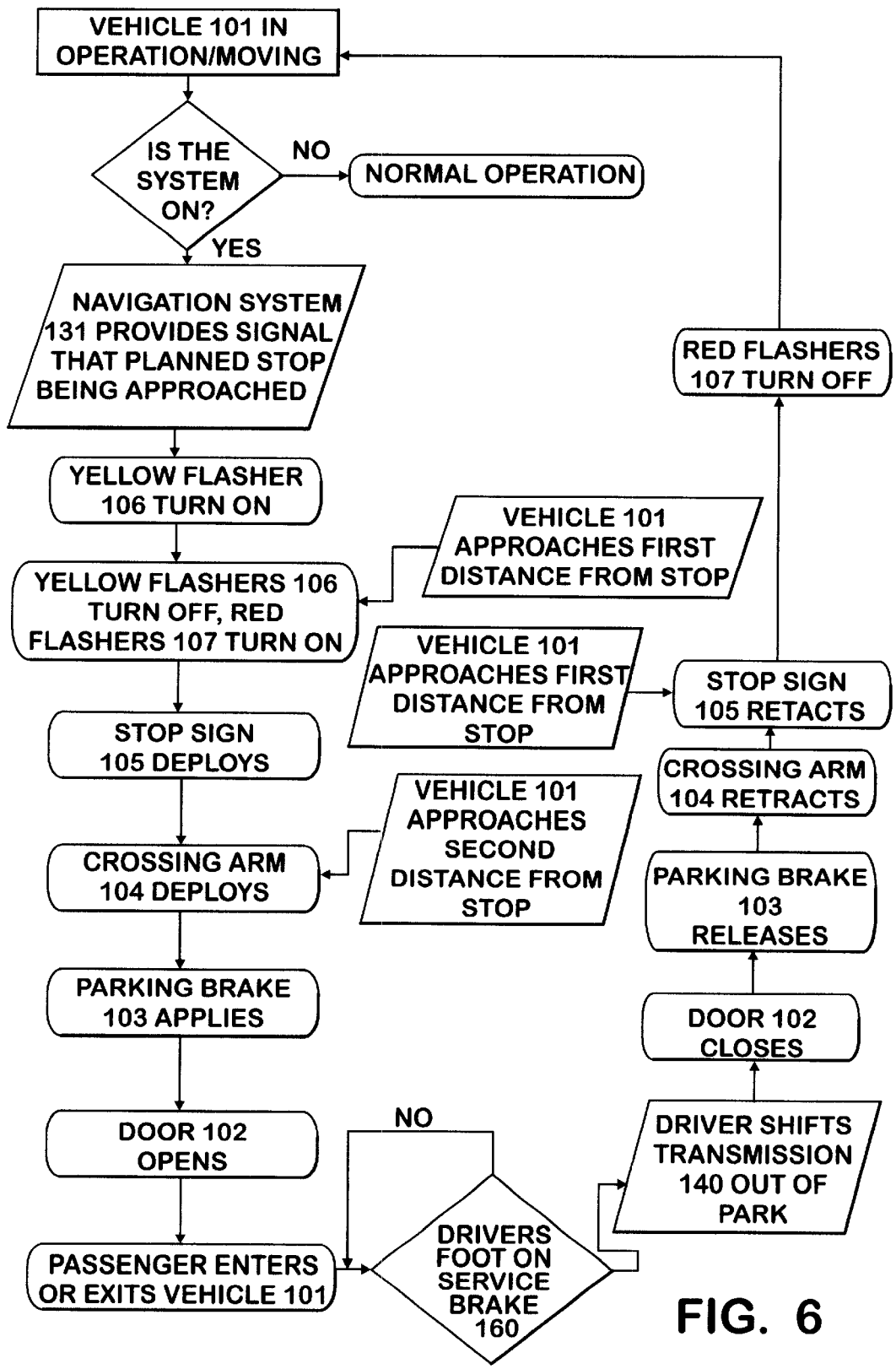
FIG. 6 is a third embodiment of logic employed in the stopping system of FIG. 1.
Figure 9:
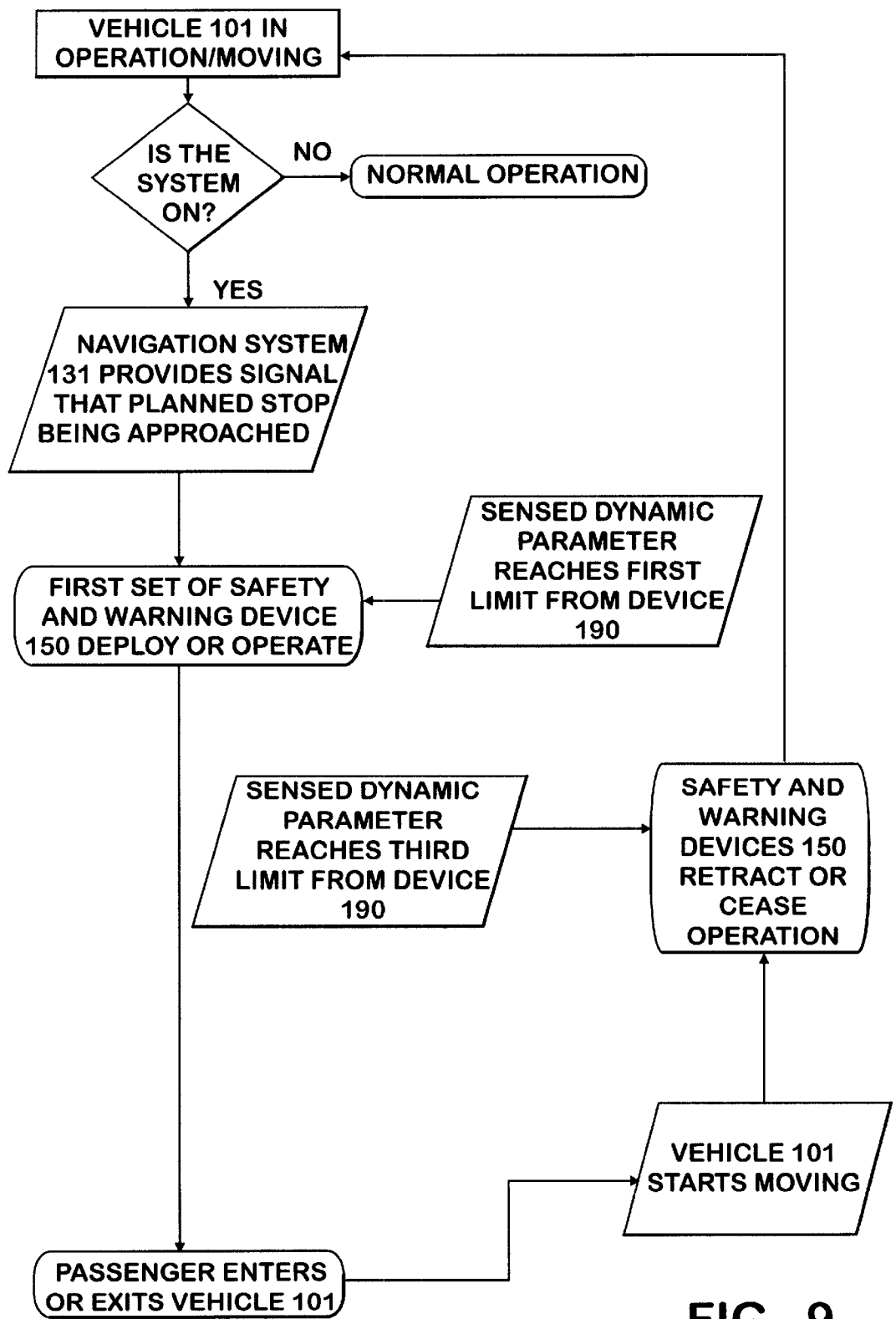
FIG. 9 is a sixth embodiment of logic employed in the stopping system of FIG. 1.
Figure 10:
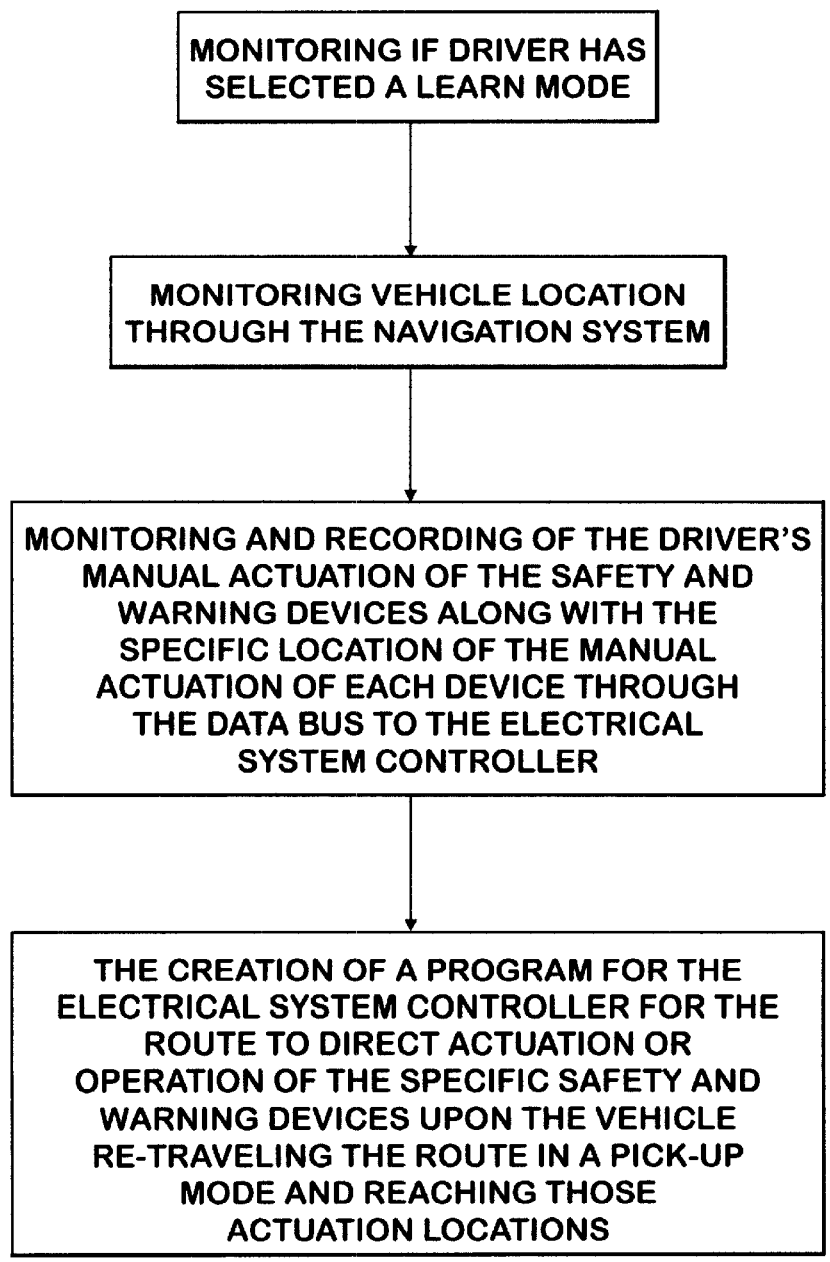
FIG. 10 is an embodiment of the learn mode logic that may be employed in a stopping system made in accordance with this invention.

In an alternative embodiment, the sensed dynamic parameter may be vehicle 101 position as sensed by the navigation system 131. See FIGS. 5 and 9, with FIG. 9 demonstrating that the embodiment shown in FIG. 8 may alternatively have a stop sequence initiated by the navigation system 131. In the embodiment, the navigation system 131 will provide vehicle geographic location to the ESC 111 through the data link 110. The vehicle stops will be programmed into the ESC 111. Rather than the driver having to actuate the button or switch 113A of the manual operator 113 to indicate a stop is being approached, the ESC 111 will initiate a stop sequence based upon the sensed approach to a designated stop. Then as the vehicle 101 slows, a stopping sequence with associated ESC 111 initiation of the applicable safety and warning devices 150 will occur upon either speed reaching the first speed limit and the second speed limit. A similar restart sequence will commence when the vehicle completes with the entry and/or egress of passengers. In a variation of this embodiment shown in FIG. 6, the first speed limit and the second speed limit will be replaced by a first distance from stop and a second distance from stop. The navigation system 131 will provide the ESC 111 with vehicle location updates. When the vehicle is a set distance, a first distance from stop, the ESC 111 will direct preprogrammed actions of the devices 150 similar to those at the first speed limit. When the vehicle is a closer preset distance to the stop, a second distance from stop, the ESC 111 will direct preprogrammed actions of the devices 150 similar to those at the second speed limit. These actions will reverse when the vehicle restarts upon completing with the entry and/or egress of passengers.

The ESC 111 may be programmed to learn a route and the automatic actions of the safety and warning devices 150 of the vehicle 101 when a driver drives the route once. The resulting sequence can vary from that shown in FIGS. 4 and 5. The ESC 111 may record the manually initiated actions and then the ESC 111 programs itself to perform all the actions related to safety and warning devices 150. The ESC 111 in this 'LEARN MODE' will record either the location of the vehicle when the driver initiates the actions and/or the speed at which they are initiated in the learning mode run of the vehicle 110. The ESC 111 then will record this route for future performance. In future trips the ESC 111 will initiate these preprogrammed actions upon reaching the set locations or speeds while approaching these locations. The 'learn mode' requires the ESC 111 to record the stop locations. The 'learn mode' allows the driver or owner of the vehicle to teach the ESC 111 new route and action sequences. One example of a variance may be a route where the crossing arm 104 needs to be deployed at some stops but at other stops traffic or road conditions preclude deploying the crossing arm 104. The algorithm for the learn mode may be embedded on any tangible media such as a computer disc, compact disc, hard drive, or external drive. The tangible media including the algorithm of the 'learn mode' may be run locally on the ESC 111 or remotely by a different processor or an external controller. External controllers would be in contact with the data link 110 through cellular or digital phone, the Internet, microwave, or radio wave device.

The algorithm of the 'learn mode' would in a fundamental form include the step of monitoring vehicle location or position through the navigation system 131. The next step would be the recording of the driver's manual actuation of the safety and warning devices 150 individually or actuation in the aggregate along with the specific location during a 'learning run' of the specific route. The next step would be creating a program for the route to direct actuation or operation of the specific safety and warning devices 150 upon the vehicle 101 in a 'pickup' mode and reaching those actuation locations for a future. An additional step in may include recording the speed at which the vehicle was traveling from the speed sensing device 121 when the driver manually actuated the safety and warning devices 150. The program creation step could include programming in the sensed speed, plus or minus some reasonable variation at actuation of the safety and warning devices 150 into the 'pickup mode' program. In this way the vehicle 101 in a future run of the route would require both the vehicle 101 to be in the location for actuation and to be a safe speed for the actuation. Another simpler variation of the 'learn mode' program would include sensing the location that the vehicle was in when the driver actuates the manual operator 113 and recording the location or the location, and speed of when this occurred. In this simpler 'learn mode' there would be a step of creating a program for inserting location, or location and speed of the actuation of the manual operator 113. This programmed step would be for an on vehicle processor to mimic the manual operator 113 initiation upon the vehicle 101 reaching the location, or location and speed of the initiation on a future run of the vehicle. In that case, the speed at actuation would at programmed speed levels such as the first and second speed limits described above.

The ESC 111 may be any programmable controller that can be networked with the applicable safety and warning devices 150 and programmed with the algorithm described above for directing the sequence of stopping actions and the algorithm for learning the stopping action sequence for future trips. Examples of other programmable controllers that may be the ESC 111 include an electronic control module (ECM) for an engine of the vehicle 101, an ECM for a transmission, or an ECM for a anti-lock brake system.

As described above, the programmable stopping system 109, and the vehicle 101 with the programmable stopping system 109 installed, of the present invention, some of which have been described above and others of which are inherent in the invention. Also modifications may be proposed to the programmable stopping system 109, and the vehicle 101 with the programmable stopping system 109 installed withoutdeparting from the teachings herein.

We claim:

1. A vehicle with a programmable stopping system, comprising:

a chassis and body;

a data bus engaged to said chassis and body;

safety and warning devices engaged to said chassis and body for operation upon the vehicle commencing to stop and stopping;

said safety and warning devices engaged to said data bus;

a sensed parameter device engaged to said data bus;

a manual operator engaged to said data bus to electrically communicate with said safety and warning devices to activate a stop sequence of operation of said devices over said data bus;

an electrical system controller electrically engaged to said data bus; and said electrical system controller programming comprising the steps of:

monitoring if the vehicle is in operation and moving;

monitoring if driver has selected entry and egress mode;

monitoring if said manual operator has been actuated, and if said vehicle is in operation, entry and egress mode is selected, and said manual operator has been actuated, directing the steps of:

monitoring a sensed dynamic parameter of said sensed parameter measurement device for the sensed dynamic parameter reaching a first limit, and directing deployment and operation of a first set of said safety and warning devices when the first limit is attained; and monitoring the sensed dynamic parameter of said sensed parameter measurement device for the sensed dynamic parameter reaching a third limit following a vehicle stop and passenger egress, and directing retraction and cessation of operation said safety and warning devices when said third limit is attained following said vehicle commencing movement.

2. A vehicle with a programmable stopping system, comprising:
   a chassis and body;
   a data bus engaged to said chassis and body;
   safety and warning devices engaged to said chassis and body for operation upon the vehicle commencing to stop and stopping;
   said safety and warning devices engaged to said data bus;
   a sensed parameter device engaged to said data bus;
   a manual operator engaged to said data bus to electrically communicate with said safety and warning devices to activate a stop sequence of operation of said devices over said data bus;
   an electrical system controller electrically engaged to said data bus; and
   said electrical system controller programming comprising the steps of:
      monitoring if the vehicle is in operation and moving;
      monitoring if driver has selected entry and egress mode;
      monitoring if said manual operator has been actuated, and if said vehicle is in operation, entry and egress mode is selected, and said manual operator has been actuated, the steps of:
         monitoring a sensed dynamic parameter of said sensed parameter measurement device for the sensed dynamic parameter reaching a first limit, and directing deployment and operation of a first set of said safety and warning devices when the first limit is attained;
         monitoring the sensed dynamic parameter of said sensed parameter measurement device for the sensed dynamic parameter reaching a second limit and directing deployment and operation of a second set of said safety and warning devices when the second limit is attained;
         directing the opening of a door for passenger egress;
         directing the closing of a door for passenger egress upon the vehicle commencing movement; and
         monitoring the sensed dynamic parameter of said sensed parameter measurement device for the sensed dynamic parameter reaching a third limit, and directing retraction and cessation of operation said safety and warning devices when said third limit is attained following said vehicle commencing movement.

3. A vehicle with a programmable stopping system, comprising:
   a chassis and body;
   a data bus engaged to said chassis and body;
   safety and warning devices engaged to said chassis and body for operation upon the vehicle commencing to stop and stopping;
   said safety and warning devices engaged to said data bus;
   a sensed parameter device engaged to said data bus;
   a manual operator engaged to said data bus to electrically communicate with said safety and warning devices to activate a stop sequence of operation of said devices over said data bus;
   wherein said safety and warning devices include:
      a vehicle door operator for operating a vehicle door;
      a stop sign operator for deploying and retracting a stop sign;
      a controller for operating yellow flashing lights;
      a controller for operating red flashing lights;
      said vehicle door operator, said stop sign operator, said controllers for operating yellow and red lights flashing lights all electrically engaged to said data bus;
      a crossing arm operator for deploying and retracting a crossing guard; and
      said crossing arm operator electrically engaged to said data bus;
   an electrical system controller electrically engaged to said data bus;
   said sensed parameter measurement device is a speed sensing device; and
   said electrical system controller programming comprising the steps of:
      monitoring if the vehicle is in operation and moving;
      monitoring if driver has selected entry and egress mode; and
      monitoring if said manual operator has been actuated, and if said vehicle is in operation, entry and egress mode is selected, and if said manual operator has been actuated directing said controller for operating yellow flashing lights to turn On said yellow flashing lights and directing performance of the steps of;
         monitoring vehicle speed from said speed sensing device for vehicle speed slowing under a first speed limit, and directing said controller for operating yellow flashing lights to turn off said yellow flashing lights and directing said controller for operating red flashing lights to turn On said red flashing lights when the first speed limit is attained;
         directing said stop sign operator to deploy said stop sign;
         monitoring vehicle speed from said speed sensing device for vehicle speed slowing under a second speed limit, and directing said crossing arm operator to deploy said crossing guard when the second speed limit is attained;
         directing said vehicle door operator to open a door for passenger egress;
         directing said vehicle door operator to close said door for passenger egress upon the vehicle commencing movement;
         directing said crossing arm operator to retract said crossing guard; and
         monitoring vehicle speed from said speed sensing device for vehicle speed increasing to the first speed limit, and directing said stop sign operator to retract said stop sign and said controller for operating red flashing lights to turn off.

4. A vehicle with a programmable stopping system, comprising:
   a chassis and body;
   a data bus engaged to said chassis and body;
   safety and warning devices engaged to said chassis and body for operation upon the vehicle commencing to stop and stopping;
   said safety and warning devices engaged to said data bus;
   a sensed parameter device engaged to said data bus;
   a manual operator engaged to said data bus to electrically communicate with said safety and warning devices to activate a stop sequence of operation of said devices over said data bus;

wherein said safety and warning devices include:
  a vehicle door operator for operating a vehicle door;
  a stop sign operator for deploying and retracting a stop sign;
  a controller for operating yellow flashing lights;
  a controller for operating red flashing lights;
  said vehicle door operator, said stop sign operator, said controllers for operating yellow and red lights flashing lights all electrically engaged to said data bus;
  a crossing arm operator for deploying and retracting a crossing guard;
  said crossing arm operator electrically engaged to said data bus;
  a parking brake actuator for engaging and disengaging a parking brake of the vehicle; and
  said parking brake actuator electrically engaged to said data bus;
an electrical system controller electrically engaged to said data bus;
said sensed parameter measurement device is a speed sensing device; and
said electrical system controller programming comprising the steps of:
  monitoring if the vehicle is in operation and moving;
  monitoring if driver has selected entry and egress mode; and
  monitoring if said manual operator has been actuated, and if said vehicle is in operation, entry and egress mode is selected, and if said manual operator has been actuated directing said controller for operating yellow flashing lights to turn On said yellow flashing lights and directing performance of the steps of;
    monitoring vehicle speed from said speed sensing device for vehicle speed slowing under a first speed limit, and directing said controller for operating yellow flashing lights to turn off said yellow flashing lights and directing said controller for operating red flashing lights to turn On said red flashing lights when the first speed limit is attained;
    directing said stop sign operator to deploy said stop sign;
    monitoring vehicle speed from said speed sensing device for vehicle speed slowing under a second speed limit, and directing said crossing arm operator to deploy said crossing guard when the second speed limit is attained;
    directing said parking brake actuator to engage said parking brake;
    directing said vehicle door operator to open a door for passenger egress;
    directing said vehicle door operator to close said door for passenger egress upon both a service brake pedal depressed and a transmission being shifted out of a PARK position;
    directing said parking brake actuator to release said parking brake directing said crossing arm operator to retract said crossing guard; and
    monitoring vehicle speed from said speed sensing device for vehicle speed increasing to the first speed limit, and directing said stop sign operator to retract said stop sign and said controller for operating red flashing lights to turn off when the first speed limit is attained.

5. The vehicle of claim 4, wherein:
said electrical system controller programmed to execute a load management program that oversees a total load imposed on a vehicle electrical system and power train by various accessories installed on said body and chassis.

6. The vehicle of claim 5, wherein:
the first speed limit is a greater speed than the second speed limit.

7. The vehicle of claim 6, wherein:
the first speed limit is 5 miles per hour; and
the second speed limit is 2 miles per hour.

8. A vehicle with a programmable stopping system, comprising:
  a chassis and body;
  a data bus engaged to said chassis and body;
  safety and warning devices engaged to said chassis and body for operation upon the vehicle commencing to stop and stopping;
  said safety and warning devices engaged to said data bus;
  a sensed parameter device engaged to said data bus;
  a manual operator engaged to said data bus to electrically communicate with said safety and warning devices to activate a stop sequence of operation of said devices over said data bus;
  wherein said safety and warning devices include:
    a vehicle door operator for operating a vehicle door;
    a stop sign operator for deploying and retracting a stop sign;
    a controller for operating yellow flashing lights;
    a controller for operating red flashing lights;
    said vehicle door operator, said stop sign operator, said controllers for operating yellow and red lights flashing lights all electrically engaged to said data bus;
    a crossing arm operator for deploying and retacting a crossing guard;
    said crossing arm operator electrically engaged to said data bus;
    a parking brake actuator for engaging and disengaging a parking brake of the vehicle; and
    said parking brake actuator electrically engaged to said data bus;
  an electrical system controller electrically engaged to said data bus;
  said sensed parameter measurement device is a navigation system; and
  said electrical system controller programming comprising the steps of:
    monitoring if the vehicle is in operation and moving;
    monitoring if driver has selected entry and egress mode; and
    monitoring for when said navigation system provides a signal that a planned vehicle stop is being approached, and if said vehicle is in operation, entry and egress mode is selected, and if a planned vehicle stop is approached, directing said controller for operating yellow flashing lights to turn On said yellow flashing lights and directing performance of the steps of:
      monitoring vehicle speed from said speed sensing device for vehicle speed slowing under a first speed limit, and directing said controller for operating yellow flashing lights to turn off said yellow flashing lights and directing said controler for operating red flashing lights to turn On said red flashing lights when the first speed limit is attained;

directing said stop sign operator to deploy said stop sign:

monitoring vehicle speed from said speed sensing device for vehicle speed slowing under a second speed limit, and directing said crossing arm operator to deploy said crossing guard when the second speed limit is attained;

directing said parking brake actuator to engage said parking brake;

directing said vehicle door operator to open a door for passenger egress;

directing said vehicle door operator to close said door for passenger egress upon both a service brake pedal depressed and a transmission being shifted out of a PARK position;

directing said parking brake actuator to release said parking brake directing said crossing arm operator to retract said crossing guard; and monitoring vehicle speed from said speed sensing device for vehicle speed increasing to the first speed limit, and directing said stop sign operator to retract said stop sign and said controller for operating red flashing lights to turn off when the first speed limit is attained.

9. The vehicle of claim 8, wherein:

said electrical system controller programmed to execute a load management program that oversees a total load imposed on a vehicle electrical system and power train by various accessories installed on said body and chassis.

10. The vehicle of claim 9, wherein:

the first speed limit is a greater speed than the second speed limit.

11. The vehicle of claim 10, wherein:

the first speed limit is 5 miles per hour; and the second speed limit is 2 miles per hour.

12. A vehicle with a programmable stopping system, comprising:

a chassis and body;

a data bus engaged to said chassis and body;

safety and warning devices engaged to said chassis and body for operation upon the vehicle commencing to stop and stopping;

said safety and warning devices engaged to said data bus;

a sensed parameter device engaged to said data bus;

a manual operator engaged to said data bus to electrically communicate with said safety and warning devices to activate a stop sequence of operation of said devices over said data bus;

wherein said safety and warning devices include:

a vehicle door operator for operating a vehicle door;

a stop sign operator for deploying and retracting a stop sign;

a controller for operating yellow flashing lights;

a controller for operating red flashing lights;

said vehicle door operator, said stop sign operator, said controllers for operating yellow and red lights flashing lights all electrically engaged to said data bus;

a crossing arm operator for deploying and retracting a crossing guard;

said crossing arm operator electrically engaged to said data bus;

a parking brake actuator for engaging and disengaging a parking brake of the vehicle; and said parking brake actuator electrically engaged to said data bus;

an electrical system controller electrically engaged to said data bus;

said sensed parameter measurement device is a navigation system; and said electrical system controller programming comprising the steps of:

monitoring if the vehicle is in operation and moving;

monitoring if driver has selected entry and egress mode; and monitoring for when said navigation system provides a signal that a planned vehicle stop is being approached, and if said vehicle is in operation, entry and egress mode is selected, and if a planned vehicle stop is approached, directing said controller for operating yellow flashing lights to turn On said yellow flashing lights and directing performance of the steps of:

monitoring vehicle location from said navigation system for a first distance from vehicle stop, and directing said controller for operating yellow flashing lights to turn off said yellow flashing lights and directing said controller for operating red flashing lights to turn On said red flashing lights when the first distance from vehicle stop is attained;

directing said stop sign operator to deploy said stop sign;

monitoring vehicle location from said navigation system for a second distance from vehicle stop, and directing said crossing arm operator to deploy said crossing guard when the second distance from vehicle is attained;

directing said parking brake actuator to engage said parking brake;

directing said vehicle door operator to open a door for passenger egress;

directing said vehicle door operator to close said door for passenger egress upon both a service brake pedal depressed and a transmission being shifted out of a PARK position;

directing said parking brake actuator to release said parking brake directing said crossing arm operator to retract said crossing guard; and monitoring vehicle location from said navigation system for a first distance from vehicle stop, and directing said stop sign operator to retract said stop sign and said controller for operating red flashing lights to turn off when said first distance from stop is attained.

13. The vehicle of claim 12, wherein:

said electrical system controller programmed to execute a load management program that oversees a total load imposed on a vehicle electrical system and power train by various accessories installed on said body and chassis.

14. The vehicle of claim 13, wherein:

the first distance from vehicle stop is a farther distance from the vehicle stop than the second distance from stop.

15. A vehicle stopping system for engagement to a mobile vehicle for directing the operation of safety and warning devices of the vehicle, the vehicle having an a data bus engaged to a chassis and body, the safety and warning devices electrically engaged to the data bus and engaged to the vehicle for operation upon the vehicle commencing to stop and stopping, a sensed parameter device engaged to the data bus, a manual operator engaged to the data bus to electrically communicate with the safety and warning devices to activate a stop sequence of operation of the safety and warning devices over the data bus, and an electrical system controller electrically engaged to the data bus, comprising:

a computer useable medium having computer readable program means embodied in said medium for causing the monitoring if the vehicle is in operation and moving;

computer readable program means for causing the monitoring if driver has selected entry and egress mode;

computer readable program means for causing the monitoring if the manual operator has been actuated, and if the vehicle is in operation, entry and egress mode is selected, and the manual operator has been actuated, directing the steps of:

monitoring a sensed dynamic parameter of the sensed parameter device for the sensed dynamic parameter reaching a first limit, and directing deployment and operation of a first set of the safety and warning devices when the first limit is attained; and monitoring the sensed dynamic parameter of the sensed parameter measurement device for the sensed dynamic parameter reaching a third limit following a vehicle stop and passenger egress, and directing retraction and cessation of operation the safety and warning devices when the third limit is attained following the vehicle commencing movement.

16. A vehicle stopping system for engagement to a mobile vehicle for directing the operation of safety and warning devices of the vehicle, the vehicle having an a data bus engaged to a chassis and body, the safety and warning devices electrically engaged to the data bus and engaged to the vehicle for operation upon the vehicle commencing to stop and stopping, a sensed parameter device engaged to the data bus, a manual operator engaged to the data bus to electrically communicate with the safety and warning devices to activate a stop sequence of operation of the safety and warning devices over the data bus, and an electrical system controller electrically engaged to the data bus, comprising:

a computer useable medium having computer readable program means embodied in said medium for causing the monitoring if the vehicle is in operation and moving;

computer readable program means for causing the monitoring if driver has selected entry and egress mode;

computer readable program means for causing the monitoring if the manual operator has been actuated, and if the vehicle is in operation, entry and egress mode is selected, and the manual operator has been actuated, directing the steps of:

monitoring a sensed dynamic parameter of the sensed parameter measurement device for the sensed dynamic parameter reaching a first limit, and directing deployment and operation of a first set of the safety and warning devices when the first limit is attained;

monitoring the sensed dynamic parameter of the sensed parameter measurement device for the sensed dynamic parameter reaching a second limit, and directing deployment and operation of a second set of the safety and warning devices when the second limit is attained;

directing the opening of a door for passenger egress;

directing the closing of a door for passenger egress upon the vehicle commencing movement; and monitoring the sensed dynamic parameter of the sensed parameter measurement device for the sensed dynamic parameter reaching a third limit, and directing retraction and cessation of operation the safety and warning devices when the third limit is attained following the vehicle commencing movement.

17. A vehicle stopping system for engagement to a mobile vehicle for directing the operation of safety and warning devices of the vehicle, the vehicle having an a data bus engaged to a chassis and body, the safety and warning devices electrically engaged to the data bus and engaged to the vehicle for operation upon the vehicle commencing to stop and stopping, a vehicle speed sensing device engaged to the data bus, a manual operator engaged to the data bus to electrically communicate with the safety and warning devices to activate a stop sequence of operation of the safety and warning devices over the data bus, the safety and warning devices including a vehicle door operator for operating a vehicle door, a stop sign operator for deploying and retracting a stop sign, a controller for operating yellow flashing lights, a controller for operating red flashing lights, and a crossing arm operator for deploying and retracting a crossing guard and an electrical system controller electrically engaged to the data bus, comprising:

a computer useable medium having computer readable program means embodied in said medium for causing the monitoring if the vehicle is in operation and moving;

computer readable program means for causing the monitoring if driver has selected entry and egress mode;

computer readable program means for causing the monitoring if the manual operator has been actuated, and if the vehicle is in operation, entry and egress mode is selected, and the manual operator has been actuated, directing the steps of:

monitoring if the vehicle is in operation and moving;

monitoring if driver has selected entry and egress mode; and monitoring if the manual operator has been actuated, and if the vehicle is in operation, entry and egress mode is selected, and if the manual operator has been actuated directing the controller for operating yellow flashing lights to turn On the yellow flashing lights and directing performance of the steps of:

monitoring vehicle speed from the speed sensing device for vehicle speed slowing under a first speed limit, and directing the controller for operating yellow flashing lights to turn off the yellow flashing lights and directing the controller for operating red flashing lights to turn On the red flashing lights when the first speed limit is attained;

directing the stop sign operator to deploy the stop sign;

monitoring vehicle speed from the speed sensing device for vehicle speed slowing under a second speed limit, and directing the crossing arm operator to deploy the crossing guard when the second speed limit is attained;

directing the vehicle door operator to open a door for passenger egress;

directing the vehicle door operator to close the door for passenger egress upon the vehicle commencing movement;

directing the crossing arm operator to retract the crossing guard; and monitoring vehicle speed from the speed sensing device for vehicle speed increasing to the first speed limit, and directing the stop sign operator to retract the stop sign and the controller for operating red flashing lights to turn off when the first speed limit is attained.

18. A vehicle stopping system for engagement to a mobile vehicle for directing the operation of safety and warning devices of the vehicle, the vehicle having an a data bus engaged to a chassis and body, the safety and warning devices electrically engaged to the data bus and engaged to the vehicle for operation upon the vehicle commencing to stop and stopping, a vehicle speed sensing device engaged to the data bus, a manual operator engaged to the data bus to electrically communicate with the safety and warning devices to activate a stop sequence of operation of the safety and warning devices over the data bus, the safety and warning devices including a vehicle door operator for operating a vehicle door, a stop sign operator for deploying and retracting a stop sign, a controller for operating yellow flashing lights, a controller for operating red flashing lights, a crossing arm operator for deploying and retracting a crossing guard, and a parking brake actuator for engaging and disengaging a parking brake of the vehicle, and an electrical system controller electrically engaged to the data bus, comprising:

a computer useable medium having computer readable program means embodied in said medium for causing the monitoring if the vehicle is in operation and moving;

computer readable program means for causing the monitoring if driver has selected entry and egress mode;

computer readable program means for causing the monitoring if the manual operator has been actuated, and if the vehicle is in operation, entry and egress mode is selected, and the manual operator has been actuated, directing the steps of:

monitoring if the vehicle is in operation and moving;

monitoring if driver has selected entry and egress mode; and monitoring if the manual operator has been actuated, and if the vehicle is in operation, entry and egress mode is selected, and if the manual operator has been actuated directing the controller for operating yellow flashing lights to turn On the yellow flashing lights and directing performance of the steps of:

monitoring vehicle speed from the speed sensing device for vehicle speed slowing under a first speed limit, and directing the controller for operating yellow flashing lights to turn off the yellow flashing lights and directing the controller for operating red flashing lights to turn On the red flashing lights when the first speed limit is attained;

directing the stop sign operator to deploy the stop sign;

monitoring vehicle speed from the speed sensing device for vehicle speed slowing under a second speed limit, and directing the crossing arm operator to deploy the crossing guard when the second speed limit is attained;

directing the parking brake actuator to engage the parking brake;

directing the vehicle door operator to open a door for passenger egress;

directing the vehicle door operator to close the door for passenger egress upon both a service brake pedal depressed and a transmission being shifted out of a PARK position;

directing the parking brake actuator to release the parking brake directing the crossing arm operator to retract the crossing guard; and monitoring vehicle speed from the speed sensing device for vehicle speed increasing to the first speed limit, and directing the stop sign operator to retract the stop sign and the controller for operating red flashing lights to turn off when the first speed limit is attained.

19. A vehicle stopping system for engagement to a mobile vehicle for directing the operation of safety and warning devices of the vehicle, the vehicle having an a data bus engaged to a chassis and body, the safety and warning devices electrically engaged to the data bus and engaged to the vehicle for operation upon the vehicle commencing to stop and stopping, a navigation system engaged to the data bus, a manual operator engaged to the data bus to electrically communicate with the safety and warning devices to activate a stop sequence of operation of the safety and warning devices over the data bus, the safety and warning devices including a vehicle door operator for operating a vehicle door, a stop sign operator for deploying and retracting a stop sign, a controller for operating yellow flashing lights, a controller for operating red flashing lights, a crossing arm operator for deploying and retracting a crossing guard, and a parking brake actuator for engaging and disengaging a parking brake of the vehicle, and an electrical system controller electrically engaged to the data bus, comprising:

a computer useable medium having computer readable program means embodied in said medium for causing the monitoring if the vehicle is in operation and moving;

computer readable program means for causing the monitoring if driver has selected entry and egress mode;

computer readable program means for causing the monitoring if the manual operator has been actuated, and if the vehicle is in operation, entry and egress mode is selected, and the manual operator has been actuated, directing the steps of:

monitoring if the vehicle is in operation and moving;

monitoring if driver has selected entry and egress mode; and monitoring for when the navigation system provides a signal that a planned vehicle stop is being approached, and if the vehicle is in operation, entry and egress mode is selected, and if a planned vehicle stop is approached, directing the controller for operating yellow flashing lights to turn On said yellow flashing lights and directing performance of the steps of:

monitoring vehicle speed from the speed sensing device for vehicle speed slowing under a first speed limit, and directing the controller for operating yellow flashing lights to turn off the yellow flashing lights and directing the controller for operating red flashing lights to turn On the red flashing lights when the first speed limit is attained;

directing the stop sign operator to deploy the stop sign;

monitoring vehicle speed from the speed sensing device for vehicle speed slowing under a second speed limit, and directing the crossing arm operator to deploy the crossing guard when the second speed limit is attained;

directing the parking brake actuator to engage the parking brake;

directing the vehicle door operator to open a door for passenger egress;

directing the vehicle door operator to close the door for passenger egress upon both a service brake pedal depressed and a transmission being shifted out of a PARK position;

directing the parking brake actuator to release the parking brake directing the crossing arm operator to retract the crossing guard; and monitoring vehicle speed from the speed sensing device for vehicle speed increasing to the first speed limit, and directing the stop sign operator to retract the stop sign and the controller for operating red flashing lights to turn off when the first speed limit is attained.

20. A vehicle stopping system for engagement to a mobile vehicle for directing the operation of safety and warning devices of the vehicle, the vehicle having an a data bus engaged to a chassis and body, the safety and warning devices electrically engaged to the data bus and engaged to the vehicle for operation upon the vehicle commencing to stop and stopping, a navigation system engaged to the data bus, a manual operator engaged to the data bus to electrically communicate with the safety and warning devices to activate a stop sequence of operation of the safety and warning devices over the data bus, the safety and warning devices including a vehicle door operator for operating a vehicle door, a stop sign operator for deploying and retracting a stop sign, a controller for operating yellow flashing lights, a controller for operating red flashing lights, a crossing arm operator for deploying and retracting a crossing guard, and a parking brake actuator for engaging and disengaging a parking brake of the vehicle, and an electrical system controller electrically engaged to the data bus, comprising:

a computer useable medium having computer readable program means embodied in said medium for causing the monitoring if the vehicle is in operation and moving;

computer readable program means for causing the monitoring if driver has selected entry and egress mode;

computer readable program means for causing the monitoring if the manual operator has been actuated, and if the vehicle is in operation, entry and egress mode is selected, and the manual operator has been actuated, directing the steps of:

monitoring if the vehicle is in operation and moving;

monitoring if driver has selected entry and egress mode; and monitoring for when the navigation system provides a signal that a planned vehicle stop is being approached, and if the vehicle is in operation, entry and egress mode is selected, and if a planned vehicle stop is approached, directing the controller for operating yellow flashing lights to turn On said yellow flashing lights and directing performance of the steps of:

monitoring vehicle location from the navigation system for a first distance from vehicle stop, and directing the controller for operating yellow flashing lights to turn off the yellow flashing lights and directing the controller for operating red flashing lights to turn On the red flashing lights when the first distance from vehicle stop is attained;

directing the stop sign operator to deploy the stop sign;

monitoring vehicle location from the navigation system for a second distance from vehicle stop, and directing the crossing arm operator to deploy the crossing guard when the second distance from vehicle is attained;

directing the parking brake actuator to engage the parking brake;

directing the vehicle door operator to open a door for passenger egress;

directing the vehicle door operator to close the door for passenger egress upon both a service brake pedal depressed and a transmission being shifted out of a PARK position;

directing the parking brake actuator to release the parking brake directing the crossing arm operator to retract the crossing guard; and monitoring vehicle location from the navigation system for a first distance from vehicle stop, and directing the stop sign operator to retract the stop sign and the controller for operating red flashing lights to turn off when the first distance from stop is attained.

21. A vehicle stopping system for engagement to a mobile vehicle for learning a sequence of steps when to direct the operation of safety and warning devices of the vehicle, the vehicle having a data bus engaged to a chassis and body, the safety and warning devices electrically engaged to the data bus and engaged to the vehicle for operation upon the vehicle commencing to stop and stopping, a navigation system engaged to the data bus to electrically communicate with an electrical system controller electrically engaged to the data bus to activate a sequence of operation of the safety and warning devices over the data bus, comprising:

a computer useable medium having computer readable program means embodied in said medium for causing the monitoring if driver has selected a learn mode;

computer readable program means for causing the monitoring vehicle location through the navigation system;

computer readable program means for causing the monitoring and recording of the driver's manual actuation of the safety and warning devices along with the specific location of the manual actuation of each device through the data bus to the electrical system controller; and computer readable program means for causing the creating of a program for the electrical system controller for the route to direct actuation or operation of the specific safety and warning devices upon the vehicle re-traveling the route in a pickup mode and reaching those actuation locations.

22. The vehicle stopping system of claim 21, further comprising:

computer readable program means for causing the recording the speed at which the vehicle was traveling from a speed sensing device when the safety and warning devices were manually actuated; and said step of creating of a program for the electrical system controller for the route to direct actuation or operation includes programming in the sensed speed at actuation of the safety and warning devices within a band around the speed sensed at actuation during the learn mode run of the route and requiring the electrical system to controller to require both the vehicle to be in the location for actuation and to be in said speed band for the actuation in the learned route before directing actuation.

23. A vehicle stopping system for engagement to a mobile vehicle for learning a sequence of steps of when to direct the operation of safety and warning devices of the vehicle during a route, the vehicle having a data bus engaged to a chassis and body, the safety and warning devices electrically engaged to the data bus and engaged to the vehicle for operation upon the vehicle commencing to stop and stopping, a manual operator engaged to the data bus to electrically communicate with the safety and warning devices to activate a stop sequence of operation of the safety and warning devices over the data bus, a vehicle speed sensing device engaged to the data bus, a navigation system engaged to the data bus to electrically communicate with an electrical system controller electrically engaged to the data bus to activate a sequence of operation of the safety and warning devices over the data bus, comprising:

- a computer useable medium having computer readable program means embodied in said medium for causing the monitoring if driver has selected a learn mode;
- computer readable program means for causing the monitoring vehicle location through the navigation system;
- computer readable program means for causing the monitoring if the manual operator has been actuated;
- computer readable program means for causing the recording the speed at which the vehicle was traveling from a speed sensing device when the manual operator has been actuated;
- computer readable program means for causing the monitoring and recording of the driver's manual actuation of the manual operator along with the specific location of the manual actuation of each device and the speed of the vehicle at manual actuation through the data bus to the electrical system controller; and
- computer readable program means for causing the creating of a program for the electrical system controller for the route to direct actuation or operation of the specific safety and warning devices associated with the manual operator actuation upon the vehicle re-traveling the route in a pickup mode and reaching those actuation locations and within a speed band around the speed sensed at actuation during the learn mode run of the route.

* * * * *